United States Patent
Park et al.

(10) Patent No.: US 9,553,680 B1
(45) Date of Patent: Jan. 24, 2017

(54) UPLINK INTERFERENCE MITIGATION

(75) Inventors: Sungki Park, Ashburn, VA (US); Saied Kazeminejad, Ashburn, VA (US); Brett Lee Christian, Independence, MO (US); Senthil K. Veeraragavan, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 41 days.

(21) Appl. No.: 13/437,383

(22) Filed: Apr. 2, 2012

(51) Int. Cl.
*H04B 15/00* (2006.01)
*H04B 15/02* (2006.01)

(52) U.S. Cl.
CPC ............. *H04B 15/00* (2013.01); *H04B 15/02* (2013.01)

(58) Field of Classification Search
USPC ........................................................ 370/329
See application file for complete search history.

(56) References Cited

U.S. PATENT DOCUMENTS

| | | | |
|---|---|---|---|
| 7,949,343 B2 | 5/2011 | Kermoal et al. | |
| 8,135,396 B2 | 3/2012 | Terabe et al. | |
| 8,315,217 B2 | 11/2012 | Montojo et al. | |
| 8,824,311 B2 | 9/2014 | Beaudin | |
| 8,874,157 B1* | 10/2014 | Shetty | H04W 52/42 455/450 |
| 9,100,972 B2 | 8/2015 | Kim et al. | |
| 9,295,003 B2* | 3/2016 | Oteri | H04W 52/241 |
| 2008/0259802 A1* | 10/2008 | Pedersen et al. | 370/235 |
| 2009/0086843 A1* | 4/2009 | Li | 375/285 |
| 2009/0239524 A1 | 9/2009 | Terabe et al. | |
| 2010/0151876 A1* | 6/2010 | Park et al. | 455/452.2 |
| 2010/0214997 A1 | 8/2010 | Tao et al. | |
| 2010/0246503 A1 | 9/2010 | Fox et al. | |
| 2011/0053589 A1* | 3/2011 | Kimura | H04W 16/10 455/424 |
| 2011/0081865 A1* | 4/2011 | Xiao et al. | 455/63.1 |
| 2011/0116490 A1 | 5/2011 | Wilhelmsson et al. | |
| 2011/0136499 A1 | 6/2011 | Miyata | |

(Continued)

FOREIGN PATENT DOCUMENTS

| | | |
|---|---|---|
| CA | 2809721 A1 | 3/2012 |
| CN | 102932930 A | 2/2013 |

(Continued)

OTHER PUBLICATIONS

Non Final Office Action mailed Aug. 13, 2013, in U.S. Appl. No. 13/437,386.

(Continued)

*Primary Examiner* — Hassan Kizou
*Assistant Examiner* — Deepa Belur

(57) ABSTRACT

A computer-implemented method, system, and computer-readable storage media for mitigating interference in a communication system is described. A user equipment operating near an edge of its base station coverage cell may transmit a strong uplink signal, which can interfere with a nearby base station. When a serving base station recognizes a high downlink signal from a nearby base station, an interference mitigation algorithm is enabled by the serving base station. The interference mitigation algorithm of the serving base station will control the uplink signal from the user equipment, so the user equipment does not interfere with the nearby base station.

18 Claims, 8 Drawing Sheets

(56) References Cited

U.S. PATENT DOCUMENTS

| | | | |
|---|---|---|---|
| 2011/0274022 A1 | 11/2011 | Chen | |
| 2011/0319088 A1* | 12/2011 | Zhou et al. | 455/442 |
| 2012/0009909 A1* | 1/2012 | Lau | 455/418 |
| 2012/0014333 A1 | 1/2012 | Ji | |
| 2012/0014348 A1 | 1/2012 | Tanno | |
| 2012/0014360 A1 | 1/2012 | Zou | |
| 2012/0014371 A1 | 1/2012 | Weng | |
| 2012/0014468 A1 | 1/2012 | Wu | |
| 2012/0015603 A1 | 1/2012 | Proctor, Jr. | |
| 2012/0015653 A1 | 1/2012 | Paliwal | |
| 2012/0015658 A1 | 1/2012 | Kim | |
| 2012/0015664 A1 | 1/2012 | Han | |
| 2012/0020209 A1 | 1/2012 | Ghosh | |
| 2012/0020230 A1 | 1/2012 | Chen | |
| 2012/0020248 A1 | 1/2012 | Granlund | |
| 2012/0020286 A1 | 1/2012 | Damnjanovic | |
| 2012/0020311 A1 | 1/2012 | Yamada | |
| 2012/0020321 A1 | 1/2012 | Higuchi | |
| 2012/0020323 A1 | 1/2012 | Noh | |
| 2012/0020421 A1 | 1/2012 | Larsson | |
| 2012/0021753 A1 | 1/2012 | Damnjanovic | |
| 2012/0021755 A1 | 1/2012 | Chin | |
| 2012/0021757 A1 | 1/2012 | Abgrall | |
| 2012/0021788 A1 | 1/2012 | Yavuz | |
| 2012/0021798 A1 | 1/2012 | Ishii | |
| 2012/0021800 A1 | 1/2012 | Wilson | |
| 2012/0026896 A1 | 2/2012 | Li | |
| 2012/0026963 A1 | 2/2012 | Kim | |
| 2012/0026964 A1 | 2/2012 | Koivisto | |
| 2012/0026965 A1 | 2/2012 | Cho | |
| 2012/0026969 A1 | 2/2012 | Fukuoka | |
| 2012/0026986 A1 | 2/2012 | Dass | |
| 2012/0028648 A1 | 2/2012 | Chayat | |
| 2012/0040620 A1* | 2/2012 | Fu et al. | 455/63.1 |
| 2012/0082058 A1 | 4/2012 | Gerstenberger et al. | |
| 2012/0120893 A1* | 5/2012 | Baligh et al. | 370/329 |
| 2012/0134267 A1 | 5/2012 | Noriega et al. | |
| 2012/0236736 A1 | 9/2012 | Frank et al. | |
| 2012/0238263 A1 | 9/2012 | Caretti et al. | |
| 2012/0250565 A1* | 10/2012 | Zhang | H04J 11/0053 370/252 |
| 2012/0257519 A1* | 10/2012 | Frank et al. | 370/252 |
| 2012/0275327 A1* | 11/2012 | Zangi | H04L 1/0001 370/252 |
| 2012/0322453 A1* | 12/2012 | Weng | H04W 72/02 455/450 |
| 2012/0329503 A1* | 12/2012 | Jongren et al. | 455/509 |
| 2013/0005379 A1 | 1/2013 | Yamazaki | |
| 2013/0010749 A1* | 1/2013 | Chang et al. | 370/330 |
| 2013/0040683 A1* | 2/2013 | Siomina et al. | 455/517 |
| 2013/0044602 A1* | 2/2013 | Xiao | H04B 7/024 370/237 |
| 2013/0053039 A1 | 2/2013 | Jorguseski et al. | |
| 2013/0115999 A1* | 5/2013 | Sirotkin et al. | 455/522 |
| 2013/0150068 A1* | 6/2013 | Hui et al. | 455/452.2 |
| 2013/0163536 A1 | 6/2013 | Anderson et al. | |
| 2013/0170439 A1* | 7/2013 | Anderson et al. | 370/329 |
| 2013/0195051 A1 | 8/2013 | Koivisto et al. | |
| 2013/0208664 A1* | 8/2013 | Viswanathan | 370/329 |
| 2013/0223483 A1* | 8/2013 | Ghassemzadeh et al. | 375/148 |
| 2013/0229943 A1 | 9/2013 | Huang et al. | |
| 2013/0249297 A1 | 9/2013 | Takehara et al. | |
| 2013/0258869 A1* | 10/2013 | Zhou et al. | 370/252 |
| 2013/0315156 A1* | 11/2013 | Xiao | H04B 7/024 370/329 |
| 2013/0336274 A1 | 12/2013 | Simonsson et al. | |
| 2014/0031031 A1 | 1/2014 | Gauvreau et al. | |
| 2014/0057618 A1* | 2/2014 | Zirwas | H04B 7/024 455/418 |
| 2014/0071836 A1 | 3/2014 | Panchal | |
| 2014/0078951 A1* | 3/2014 | Venkatachari et al. | 370/311 |
| 2014/0105135 A1 | 4/2014 | Tellado et al. | |
| 2014/0113644 A1 | 4/2014 | Burchardt et al. | |
| 2014/0146689 A1 | 5/2014 | Gaur et al. | |
| 2014/0153433 A1 | 6/2014 | Zhou | |
| 2014/0192769 A1* | 7/2014 | Wen | H04W 72/1221 370/330 |
| 2014/0233468 A1* | 8/2014 | Hejazi | H04L 1/00 370/329 |
| 2014/0269456 A1 | 9/2014 | Wang et al. | |
| 2014/0328309 A1 | 11/2014 | Comstock | |
| 2016/0113028 A1 | 4/2016 | Caretti et al. | |
| 2016/0127069 A1 | 5/2016 | Nuss et al. | |

FOREIGN PATENT DOCUMENTS

| | | |
|---|---|---|
| WO | 2013020512 A1 | 2/2013 |
| WO | 2014131190 A1 | 9/2014 |

OTHER PUBLICATIONS

Final Office Action mailed Feb. 25, 2014 in U.S. Appl. No. 13/437,386, 19 pages.
Notice of Allowance mailed Jun. 12, 2014 in U.S. Appl. No. 13/437,386, 9 pages.
Non-Final Office Action dated Nov. 21, 2014 in U.S. Appl. No. 13/437,386, 11 pages.
Non-Final Office Action dated Dec. 31, 2014 in U.S. Appl. No. 14/466,590, 11 pages.
Final Office Action dated Sep. 30, 2015 in U.S. Appl. No. 14/466,590, 13 pages.
Non-Final Office Action dated Feb. 11, 2016 in U.S. Appl. No. 13/437,386, 16 pages.
Final Office Action dated May 21, 2015 in U.S. Appl. No. 13/437,386, 14 pages.
Final Office Action dated May 22, 2015 in U.S. Appl. No. 14/466,590, 13 pages.
Non-Final Office Action dated Jun. 1, 2016 in U.S. Appl. No. 14/466,590, 17 pages.
Final Office Action dated Aug. 31, 2016 in U.S. Appl. No. 13/437,486, 20 pages.
Analytical Evaluation of Fractional Frequency Reuse for OFDMA Cellular Networks. Thomas David Novlan, Radha Krishna Ganti, Arunabha Ghosh, Jeffrey G. Andrews; Jan. 26, 2011, 25 pages.
Final Office Action dated Nov. 17, 2016 in U.S. Appl. No. 14/466,590, 22 pages.

\* cited by examiner

UPLINK INTERFERENCE MITIGATION

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a computer-implemented method of mitigating interference is described. A high downlink (DL) signal (e.g. high Reference Signal Receive Power) from a nearby base station (BS), such as another operator's BS or a public safety service BS, is received by a user equipment (UE). A serving BS detects that the high DL signal was received by the UE via a measurement report from the UE. The serving BS infers that the UE uplink (UL) signal is interfering with the nearby BS, based upon the detected high DL signal. The serving BS enables an interference mitigation algorithm. The DL signal of the nearby BS is measured by the UE and is reported to the serving BS. The interference mitigation algorithm is disabled when the measurement is lower than a threshold level. One or more computer-readable storage media, storing computer readable instructions thereon, that when executed by a computing device, perform the process steps for a method of mitigating interference, as described above are also contemplated by embodiments of the invention.

In another embodiment of the invention, one or more computer-readable storage media storing computer readable instructions for an interference mitigation algorithm thereon, that when executed by a computing device, perform the following process steps is also described. A subframe frequency dimension is divided into a plurality of resource block (RB) zones by a serving BS. One or more of the middle band RB zones are allocated, via the serving BS, to a UE when available. When there are no middle band RB zones available, a power level of one or more sub-carriers of an edge band RB zone is reduced by the serving BS. The edge band RB zone with the reduced power level of one or more sub-carriers is allocated to the UE by the serving BS. When the power level of the one or more sub-carriers cannot be reduced, a number of RBs to the UE is reduced by the serving BS.

In still another embodiment, an interference mitigation communication system is described. The interference mitigation communication system contains a BS that serves a plurality of UEs within a power transmission coverage cell. The system also contains an interference mitigation algorithm, which is enabled by the BS for controlling an UL signal being transmitted by one of the UEs operating near an edge of the power transmission coverage cell.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Figure 1:
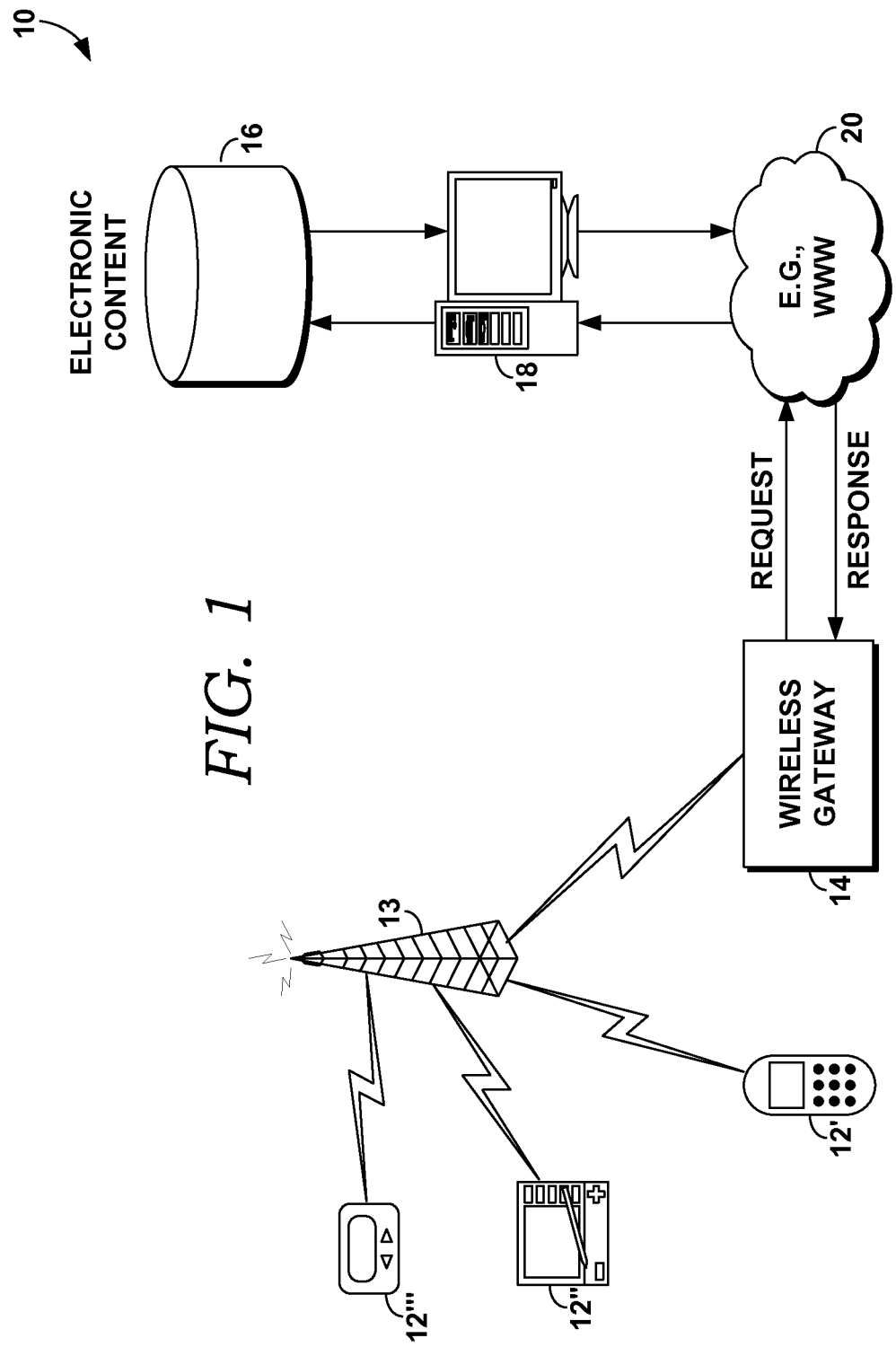
FIG. 1 is a network diagram of an exemplary telecommunications system according to embodiments of the invention.

Embodiments of the invention provide systems, methods, and computer-readable storage media with computer-readable instructions embodied thereon for mitigating communication interference. The terms "step," "block," etc. might be used herein to connote different acts of methods employed, but the terms should not be interpreted as implying any particular order, unless the order of individual steps, blocks, etc. is explicitly described. Likewise, the term "module," "component," etc., might be used herein to connote different components of systems employed, but the terms should not be interpreted as implying any particular order, unless the order of individual modules, components, etc., is explicitly described.

Throughout the description of different embodiments of the invention, several acronyms and shorthand notations are used to aid the understanding of certain concepts pertaining to the associated systems, methods and computer-readable storage media. These acronyms and shorthand notations are intended to help provide an easy methodology for communicating the ideas expressed herein and are not meant to limit the scope of any embodiment of the invention.

Embodiments of the invention include, among other things, a method, system, or set of instructions embodied on one or more computer-readable storage media. Computer-readable storage media include both volatile and nonvolatile media, removable and non-removable media, and media readable by a database and various other network devices. By way of example, and not limitation, computer-readable storage media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, Digital Versatile Discs (DVD), holographic media or other optical disc storage, magnetic cassettes, magnetic tape, magnetic disk storage, and other magnetic storage devices. These technologies can store data momentarily, temporarily, or permanently. The computer readable storage media include cooperating or interconnected computer readable storage media, which exist exclusively on a processing system or are distributed among multiple interconnected processing systems that may be local to, or remote from, the processing system. Combinations of any of the above should also be included within the scope of computer-readable storage media.

An operating environment for devices and interfaces used for embodiments of the invention include a processing system with one or more high speed central processing unit(s) (CPU), or other types of processors, a memory component, and a data storage component. The embodiments of the invention are described below with reference to acts and symbolic representations of operations or instructions that are performed by the processing system, unless indicated otherwise. Such acts and operations or instructions are referred to as being computer executed, CPU executed, or processor executed. The memory locations where data bits are maintained are physical locations that have particular electrical, magnetic, optical, or organic properties corresponding to the data bits.

An overview of a telecommunications system will be described, with reference to a network diagram of FIG. 1, which illustrates an exemplary wireless network system 10. Wireless network system 10 includes mobile devices 12, a wireless gateway 14, a database 16 including electronic content, a database server 18, and an information network 20, such as the World Wide Web (WWW). However, none of the embodiments of the invention are limited to these components and more, fewer, or other components can also be used in wireless network system 10. For simplicity, only one wireless gateway 14, database 16, and database server 18 are illustrated in FIG. 1. However, embodiments of the invention also contemplate multiple gateways, databases, and database servers.

The mobile devices 12 include a mobile phone 12', a personal digital assistant (PDA) 12", a one and two-way pager 12''', and other types of mobile devices (not illustrated). Mobile devices 12 may include devices that typically connect using a wireless communications medium such as radio frequency (RF) devices, infrared (IR) devices, or integrated devices combining one or more of the preceding devices. A mobile device, as described herein, refers to any type of wireless phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. In embodiments, computing devices can also refer to devices that are running applications of which images are captured by the camera in a mobile device.

The mobile devices 12 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 provide a Code Division Multiple Access (CDMA), Wideband CDMA (WCDMA), Time Division-Synchronous CDMA (TD-SCDMA), Advanced Mobile Phone Service (AMPS), Digital AMPS (D-AMPS), Universal Mobile Telecommunications System (UMTS), Radio Frequency (rf), paging and wireless messaging, Personal Communication Network (PCN), Global System for Mobile Communications, (GSMC), Worldwide Interoperability for Microwave Access (WiMAX), Generic Packet Radio Services (GPRS), Personal Communications Services (PCS), Cellular Digital Packet Data (CDPD), Wireless Application Protocol (WAP), Digital Audio Broadcasting (DAB), Bluetooth, 802.11a, 802.11b, or other types of wireless interfaces for the mobile devices 12. The WAP includes several protocols and standards designed to provide mobile devices with access to electronic content, and it was developed as an alternative to other markup languages and protocols developed for the World Wide Web. One component of the WAP is a Wireless Markup Language (WML), which includes markup tags, and provides control over formatting and layout of electronic content. The WML is often more appropriate to use for mobile devices such as wireless phones than other markup languages such as Hyper Text Markup Language (HTML), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The database 16 includes electronic content such as text, hypertext, graphical data or references to graphical data images, audio, video, and other content. The electronic content may be stored as a web page or WAP page on a database server, such as server 18. The server 18 can download electronic content from the database 16 to the mobile device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language (HDML), HTML, compact HTML (cHTML), eXtensible Markup Language (XML), WML and Voice extensible Markup Language (VoxML), and others. Markup languages also allow references to additional electronic content other than text, including graphics, animation, audio, video, applets, and other electronic data.

Electronic content is displayed on a mobile device 12 with a software application, such as but not limited to a "browser." A browser on a mobile device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the mobile device 12.

The mobile devices 12 illustrated in FIG. 1 operate as part of the wireless network system 10 based on standards proposed by the Institute of Electrical and Electronic Engineers (IEEE), International Telecommunications Union-Telecommunication Standardization Sector (ITU), Internet Engineering Task Force (IETF), Wireless Application Protocol (WAP) Forum, Java Community, the American National Standard Institute (ANSI), or other proprietary standards.

Each mobile device 12 is coupled to a communication tower 13 via a wireless link, as illustrated in FIG. 1. Each mobile device 12 is capable of communicating with the communication tower 13 using multiple frequency bands. A frequency band is a selected frequency range in the electromagnetic spectrum. Selected frequency bands are designated for use with wireless communications such as wireless telephony. The mobile devices 12 may use frequency bands, frames, air-interface allocation units (slots), etc. specified by the WiMAX specifications. The communication tower 13 may be any wireless system that provides the air interface to mobile devices 12. Communication tower 13 includes a base transceiver station (BTS). Communication tower 13 may include transceivers, power amplifiers, combiners, duplexers, and antennas. Communication tower 13 may also include other components, such as a control function or control computer.

Wireless mobile communication technology uses various standards and protocols to transmit data between a base transceiver station (BTS) of the communication tower 13 and a mobile device 12. A first mobile device 12, such as 12', may be using a first frequency band. A second mobile device 12, such as 12", may be using a second frequency band. The first mobile device 12' may be associated with a first wireless interface with the communication tower 13, while the second mobile device 12" may be associated with a second wireless interface with the communication tower 13. A wireless interface may correspond to an uplink communication from the mobile device 12 to the communication tower 13, or a downlink communication from the communication tower 13 to the mobile device 12.

Figure 2:
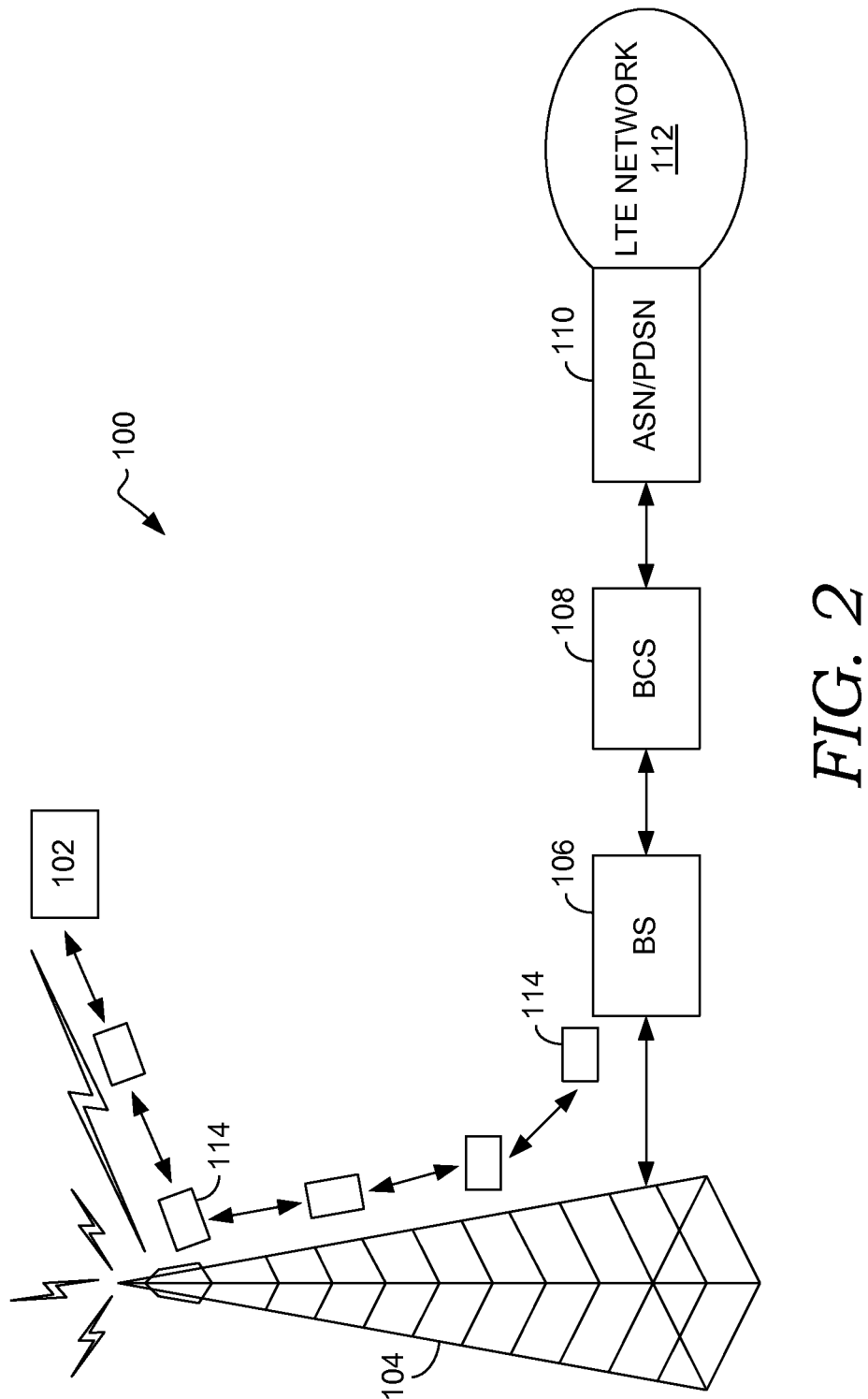
FIG. 2 is a network diagram of an exemplary communications system according to embodiments of the invention.

FIG. 2 is a network diagram of an exemplary communications system 100 according to embodiments of the invention. Mobile device 102 includes a communication interface that allows the mobile device 102 to transmit information via radio signals to a communication tower 104. A base station (BS) 106 contains equipment for transmitting and receiving radio signals from the communication tower 104. In an embodiment of the invention, BS 106 comprises a radio access network (RAN). In another embodiment of the invention, the BS 106 comprises an enhanced Node B (eNodeB). BS 106 also has other equipment for encrypting and decrypting communication with a base station controller (BSC) 108. The BSC 108 may be configured to receive radio signals that are converted into Time Division Multiplexing (TDM) from the BS 106. In an embodiment of the invention, the BSC 108 has a plurality of BS s 106 under its control. The BSC 108 can handle the allocation of radio channels, receive measurements from mobile devices, and control handovers from one BS 106 to another BS 106. The BSC 108 can be configured to send voice information from the TDM signal to a mobile switching center (MSC) and data information to an access service network (ASN) or a packet data serving node (PDSN), illustrated as ASN/PDSN 110 of a long term evolution (LTE) network 112. The ASN/PDSN 110 can act as a connection point between the radio access network (RAN) and an internet protocol (IP) network. The ASN/PDSN 110 can be responsible for managing point-to-point protocol (PPP) sessions between the mobile device's core IP network and the mobile device 102.

FIG. 2 also illustrates one or more resource blocks (RB) 114. A RB 114 is a two-dimensional (time and frequency) channel allocation. In an example, given for illustrative purposes only, a communication carrier may control a band of twenty-four contiguous RBs 114. The center RBs 114 will have the least amount of rf interference, while the RBs 114 at the edges of the contiguous group will have the most rf interference. RBs 114 within the middle regions of the contiguous group will have a moderate amount of rf interference.

Figure 3:
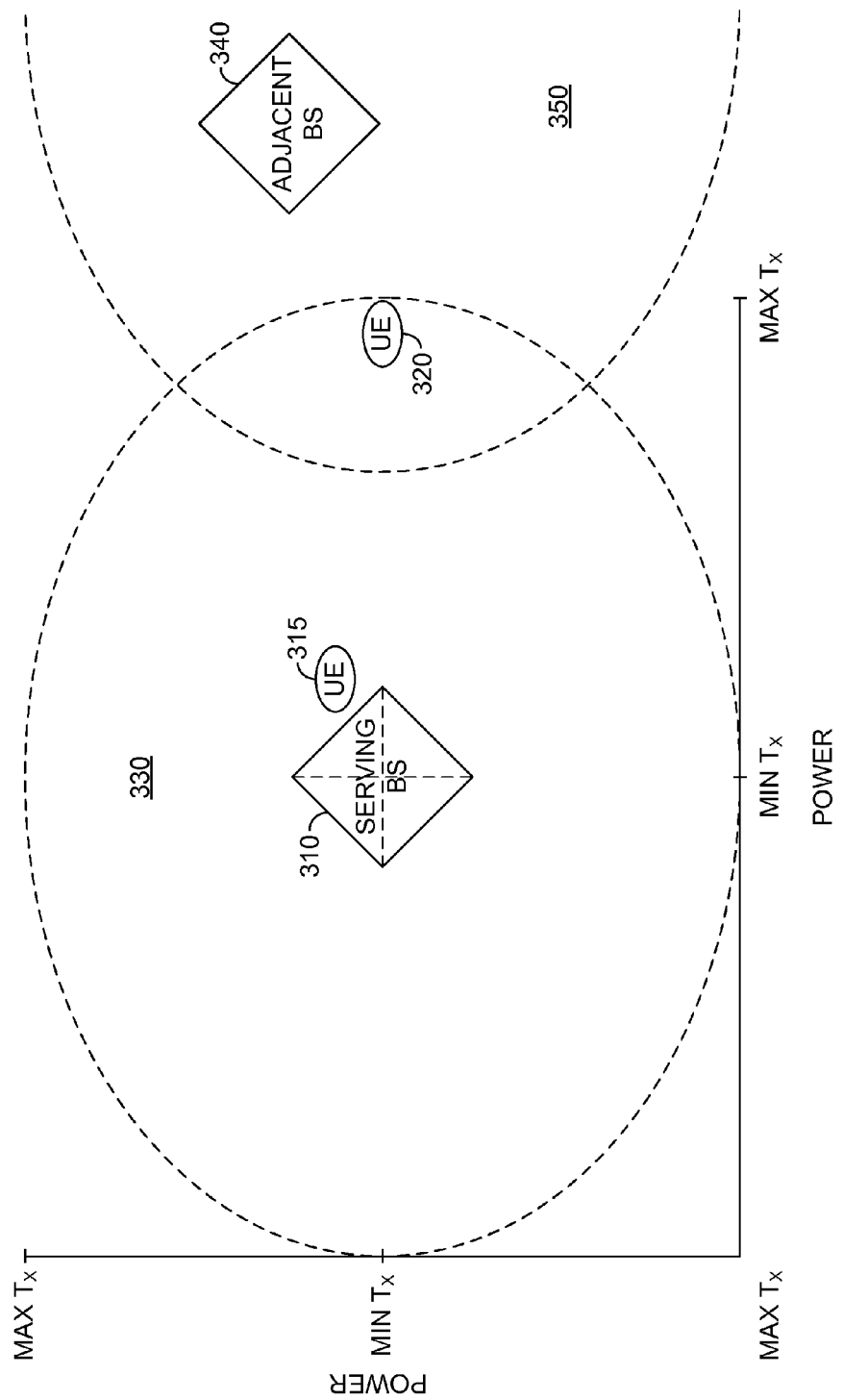
FIG. 3 is a coverage diagram that illustrates two exemplary base stations and associated exemplary user equipments according to embodiments of the invention.

FIG. 3 is a coverage diagram that illustrates a BS that serves a user equipment (UE), such as the mobile device 102 of FIG. 2. A serving BS 310 serves a plurality of UEs, such as UE 315 and UE 320. The communication waves of the serving BS 310 may propagate outwardly in a circular pattern, such as the pattern illustrated in FIG. 3, to form a cell 330 of coverage under which UEs 315 and 320 can communicate wirelessly. An example of a radial transmission distance of coverage, given for illustrative purposes only, might be in the range of 1.4 km to 100 km. Power can also be transmitted by serving BS 310 in patterns other than a circular pattern, such as an oval pattern, or an asymmetric pattern with a higher power transmission in a particular direction. The axes at the left and bottom portions of FIG. 3 illustrate the uplink (UL) power that is transmitted by UEs 315 and 320 within the cell 330 while communicating wirelessly. The axes illustrate that UE 315 transmits a minimum UL power since it is near the serving BS 310 along the horizontal axis and the vertical axis. In contrast, UE 320 is located farther away from the serving BS 310, and transmits at an increased UL power in direct proportion to its distance away from the serving BS 310.

FIG. 3 also illustrates the presence of an adjacent BS 340. The adjacent BS 340 propagates communication waves outwardly to form an adjacent cell 350. The adjacent cell 350 extends beyond the right portion of FIG. 3. The UE 320 illustrated in FIG. 3 is located near the edge of its cell 330. UE 320 is also located within the adjacent cell 350. Since UE 320 is located at the edge of its cell 330, it will transmit at maximum power. An example of a maximum UL transmission power, given for illustrative purposes only, may be 23 dBm, where dBm is defined as decibel ratio (log 10) of Watts (W) to one milliwat (1 mW). Stated another way, dBm is the output power of a signal referenced to an input signal of 1 mW. This maximum power transmission has a high probability of interfering with the adjacent BS 340, which could adversely impact the operation of other UEs operating within the adjacent cell 350. Even though there is just one adjacent BS 340 and one adjacent cell 350 illustrated in FIG. 3, there may also be other adjacent or nearby BSs and associated adjacent or nearby cells surrounding serving BS 310 and cell 330.

Certain regulatory agencies, such as the Federal Communications Commission (FCC) in the United States, control radio frequency assignments for non-government use. As an example for illustrative purposes only, the FCC has divided up the available frequencies into different groups and assigned them to a specific use. One example is a portion of the 800 MHz band, such as 809-815 MHz, that is reserved for exclusive use by public safety agencies. The 809-815 MHz band is surrounded by adjacent non-public safety agency bands, such as Specialized Mobile Radio (SMR) or Enhanced SMR (ESMR) and cellular systems.

Devices or BSs that operate in one frequency band can adversely impact the operation of devices or BSs operating in an adjacent or nearby band, due to out-of-band emission levels radiated by the respective devices or BSs. As an example for illustrative purposes only, an ESMR may operate at a frequency band of 817-824 MHz, which is near the public safety agency operating in the 809-815 MHz frequency band. A guard band may exist between the two frequency bands in the 815-817 MHz frequency band. A UE, such as UE 320 may be transmitting a high power UL signal, since it is located near the edge of its operating cell 330. As a result, the emission level of UE 320 may encroach into the 813-814 MHz frequency band, which would likely interfere with the public safety agency band. The owner or lease holder of surrounding non-public safety agency bands need to control out-of-band emissions, so as not to interfere with the public safety bands. The above embodiment was illustrated with regard to a public safety agency band and surrounding non-public safety agency bands. However, out-of-band emissions are a concern with any radio frequency assignment, and controlling their respective emissions are contemplated by embodiments of the invention herein.

There are several potential sources of interference between adjacent cells, such as one BS interfering with another BS and its associated UEs. However, a major cause of interference is from UEs, such as UE 320 interfering with another BS, such as adjacent BS 340 and its associated UEs within adjacent cell 350. Interference can be countered by limiting the out-of-band emissions. However, that solution often leads to excessive cost and a larger UE size. Interference can also be controlled by an interference mitigation technique and associated algorithm, which limits UE emissions by controlling the maximum UL transmission power of the UE, as well as the number and location of assigned resource blocks, based upon the location of the UE.

Figure 4:
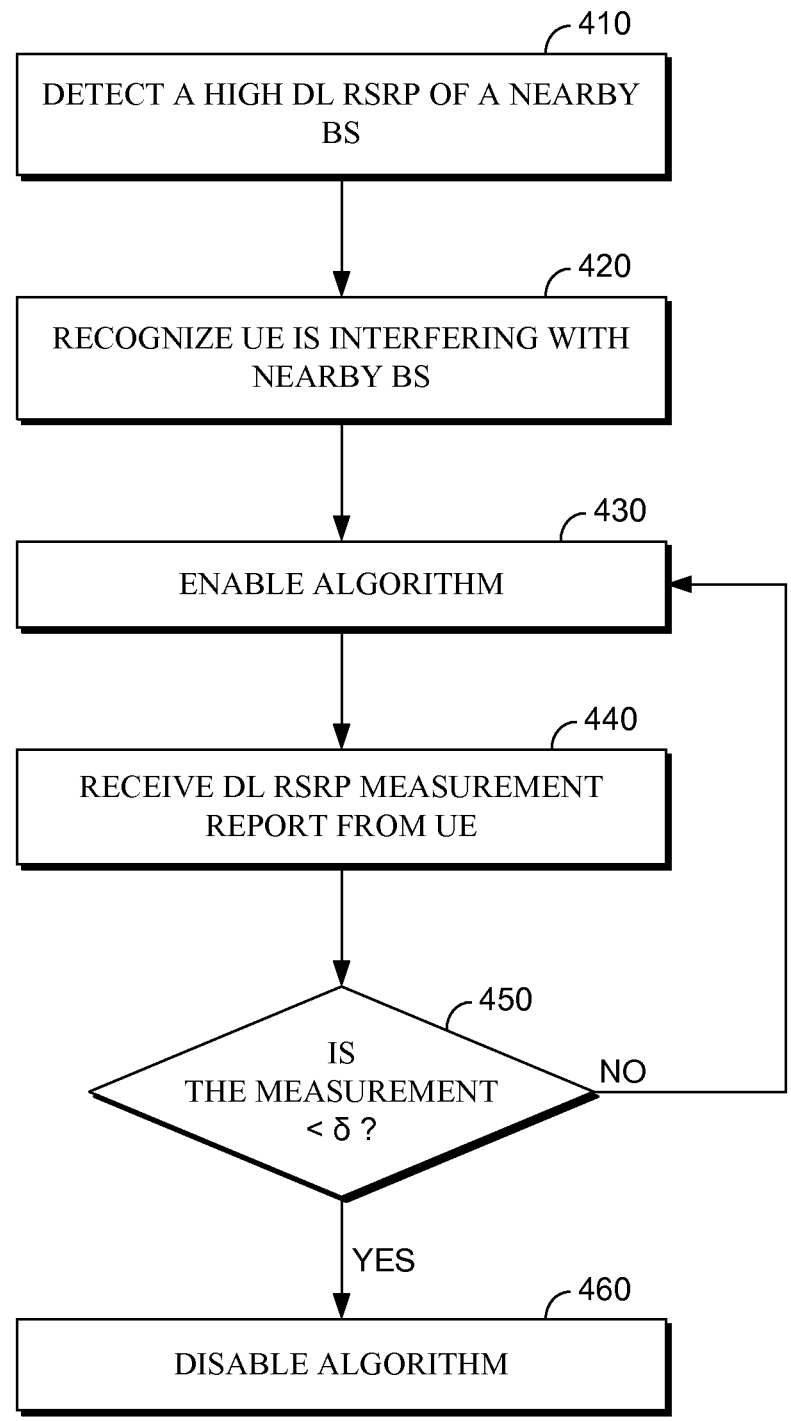
FIG. 4 is a flow diagram for an exemplary method of mitigating interference according to embodiments of the invention.

An interference mitigation technique, executed by a serving BS, such as an eNodeB, is illustrated in the flow diagram of FIG. 4. A UE, such as UE 320, measures and records an abnormally high downlink (DL) Reference Signal Receive Power (RSRP) from a nearby frequency or nearby BS, such as adjacent BS 340. The serving BS, such as serving BS 310, detects the high DL signal received by UE 320 in step 410, which can be obtained via UE 320 log records. Serving BS 310 recognizes that the UE 320 is interfering with the adjacent BS 340 in step 420. The recognition in step 420 can be inferred, based in part, upon received information, such as UE 320 log records. The serving BS 310 knows that the UE 320 is near the edge of cell 330, and is therefore transmitting at a maximum UL power. The maximum UL transmission power of the UE 320, in combination with a received high DL RSRP from adjacent BS 340, implies that the UE 320 is interfering with adjacent BS 340.

In step 430, an interference mitigation algorithm is enabled by the serving BS 310. The interference mitigation algorithm will go through a series of steps to control the maximum UL transmission power of the UE 320, as well as the number and location of assigned resource blocks. The interference mitigation algorithm will be described in more detail below with regard to FIG. 6. The UE 320 measures the DL RSRP again, and the serving BS 310 receives the measurement of the DL RSRP from the UE 320 in step 440. A determination is made by the serving BS 310, whether the measurement made by the UE 320 is less than a certain threshold value, with respect to the re-measured DL RSRP in step 450. An example of an acceptable threshold, given for illustrative purposes only, may be in the range of −100 to −60 dBm. A more specific example may be −80 dBm. If the measurement is less than a certain threshold δ, then the algorithm is disabled in step 460. If the measurement is not less than a certain threshold δ, then the algorithm is maintained, where the process returns to step 430.

A communications carrier operates within an assigned frequency domain. The assigned frequency domain contains a number of resource blocks (RBs). A RB is a two-dimensional (time and frequency) channel allocation. In an example, given for illustrative purposes only, a communication carrier may control a band of twenty-four contiguous RBs. The center RBs will have the least amount of rf interference, while the RBs at the edges of the contiguous group will have the most rf interference. RBs within the middle regions of the contiguous group will have a moderate amount of rf interference. One or more subcarriers operate within each RB.

Figure 5:
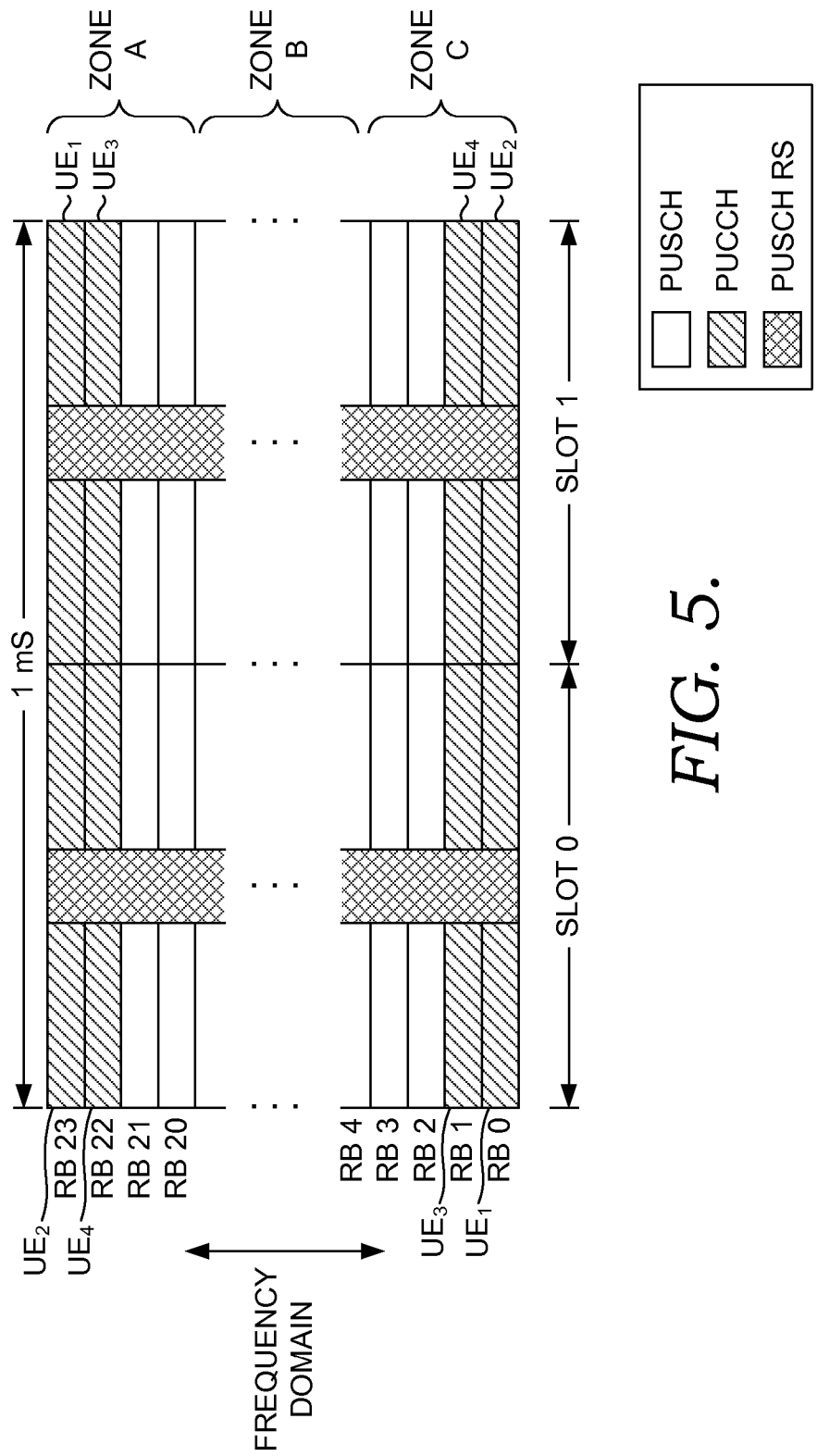
FIG. 5 is a time slot diagram that illustrates an exemplary subframe structure according to embodiments of the invention.

FIG. 5 is a time slot diagram that illustrates a subframe structure that may be used in UL long term evolution (LTE) communications for a particular frequency domain. A modulation and coding scheme (MCS) for UL channel power control is applied by a UE BS, such as serving BS 310, or more specifically, an eNodeB. The assigned frequency domain contains a number of RBs. Some RBs are allocated as physical uplink control channels (PUCCH) that transmit control information to its assigned server, such as an eNodeB. Other RBs are allocated as physical uplink shared channels (PUSCH), which are UL data channels that transmit data information to its assigned server, such as an eNodeB. A demodulation reference signal of the PUSCH is illustrated as PUSCH RS.

A number of RBs are grouped into zones, illustrated in FIG. 5 as zone A, zone B, and zone C. In the example of 24 RBs, each zone might contain 6-7 RBs. Zone A and zone C are at the edge of the frequency domain, while zone B is in the middle region of the frequency domain. Therefore, zones A and C would contain a higher level of rf interference, while zone B would contain a lower level of rf interference. As an example, the UL subframe structure of FIG. 5 contains 24 RBs and three zones. However, UL subframe structures containing other than 24 RBs and other than three zones are contemplated by embodiments of the invention.

Figure 6:
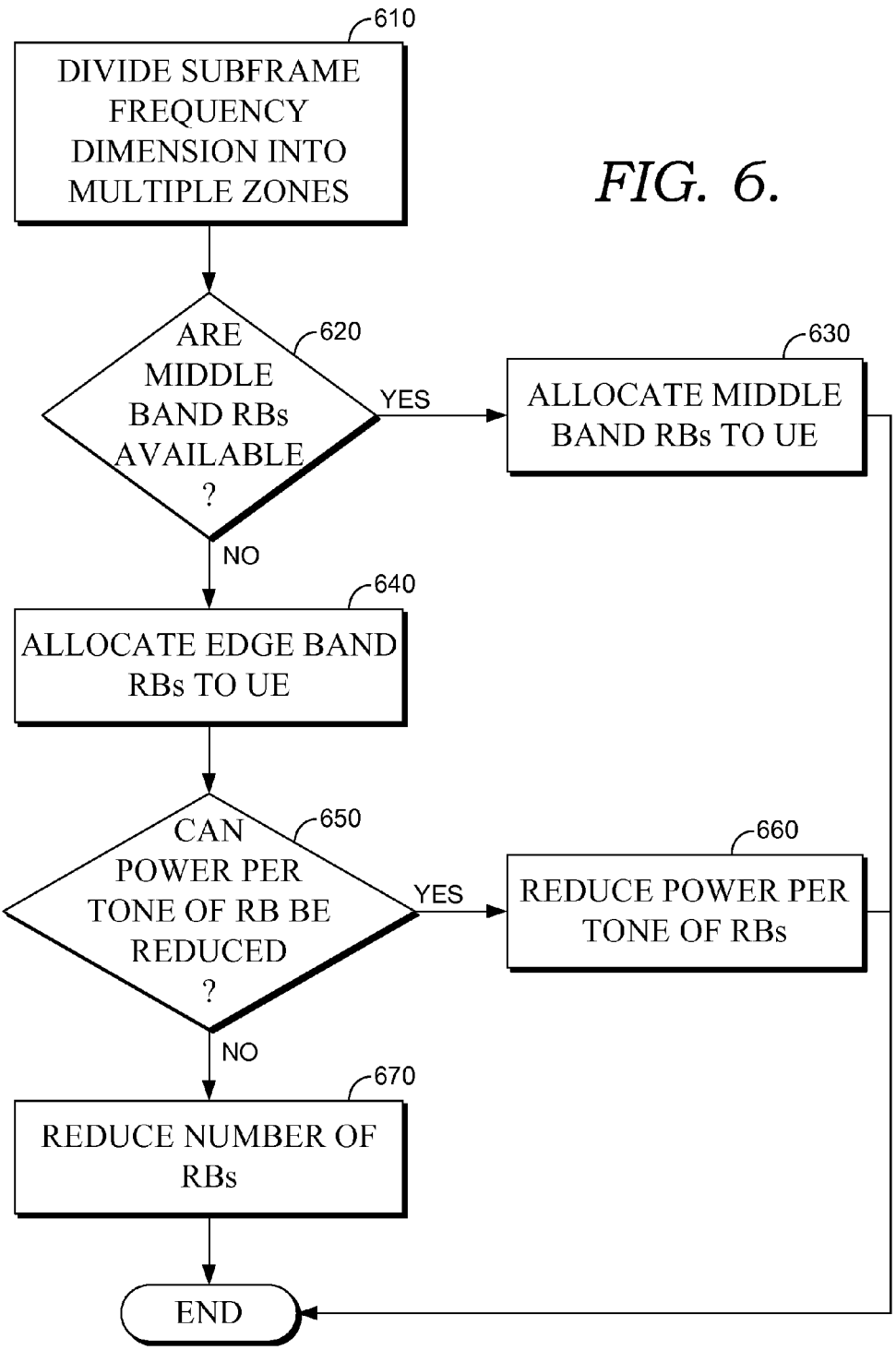
FIG. 6 is a flow diagram which illustrates exemplary process steps of an interference mitigation algorithm according to embodiments of the invention.

FIG. 6 is a flow diagram which illustrates the process steps of an interference mitigation algorithm. In step 610, the UL subframe structure of an assigned frequency domain, such as that illustrated in FIG. 5, is divided into multiple zones by a serving BS, such as serving BS 310. Serving BS 310 may be an eNodeB. Serving BS 310 recognizes that a UE, such as UE 320 is interfering with a nearby BS, such as adjacent BS 340. Since UE 320 is far from its serving BS 310, the channel state of UE 320 would not be good. Therefore, the MCS level of UE 320 needs to be applied accordingly.

Modulation protocols are specific techniques used to encode digital bits into analog signals for transmission over an analog line. The protocols define the method of encoding and the data transfer speed. Two internationally accepted modulation protocols are Quatenary Phase Shift Keying (QPSK) and Quadrature Amplitude Modulation (QAM). QPSK allows the transmission of two bits per symbol, where a symbol is defined as a phase range of a sine wave. For a transmission of two bits per symbol, two carrier signals can be used, each separated by 90 degrees of phase. QAM allows multiple bits to form a single symbol, which is impressed on a single sine wave. Quadrature means that four distinct amplitude levels are defined. As an example, 16 QAM creates a symbol of four bits through sixteen distinct variations in amplitude and phase. For a 2400 Hz carrier, a data rate of 9600 bps would be yielded.

A MCS level of a QPSK modulation and a lower bit rate might be assigned for UEs operating near the edge of their cell, such as UE 320 in cell 330, since the channel state of UE 320 is not good. On the other hand, UE 315 has a good channel state and is located near its serving BS 310. Therefore, a larger modulation level and channel coding rate might be used, such as 16 QAM and a higher bit rate.

In step 620 of FIG. 6, the interference mitigation algorithm will determine, via the serving BS 310, if any middle band RBs, such as zone B in FIG. 5, are available. If middle band RBs are available, then those RBs in the middle band are allocated by serving BS 310 to the UE 320 in step 630. The interference mitigation algorithm would end at this point, when the interference decreases to acceptable levels, such as below a threshold level. If there are no middle band RBs available in step 620, then the UE 320 is allocated a set of the edge band RBs, such as zone A or zone C, via serving BS 310 in step 640. In conjunction with allocating a set of the edge band RBs, serving BS 310 also determines whether the power per tone of the RBs can be reduced in step 650. Each RB usually has multiple sub-carriers, and reducing the power per tone would reduce the power per sub-carrier. In step 660, when the power per tone of the allocated RBs can be reduced, the power per tone is reduced, via the interference mitigation algorithm implemented by serving BS 310. The interference mitigation algorithm would end at this point, when the interference decreases to acceptable levels, such as below a threshold level. If the power per tone of the RBs cannot be reduced in step 650, then the number of RBs is reduced, via the interference mitigation algorithm implemented by serving BS 310, in step 670. The interference mitigation algorithm would end at this point, when the interference decreased to acceptable levels, such as below a threshold level.

Figure 7A:
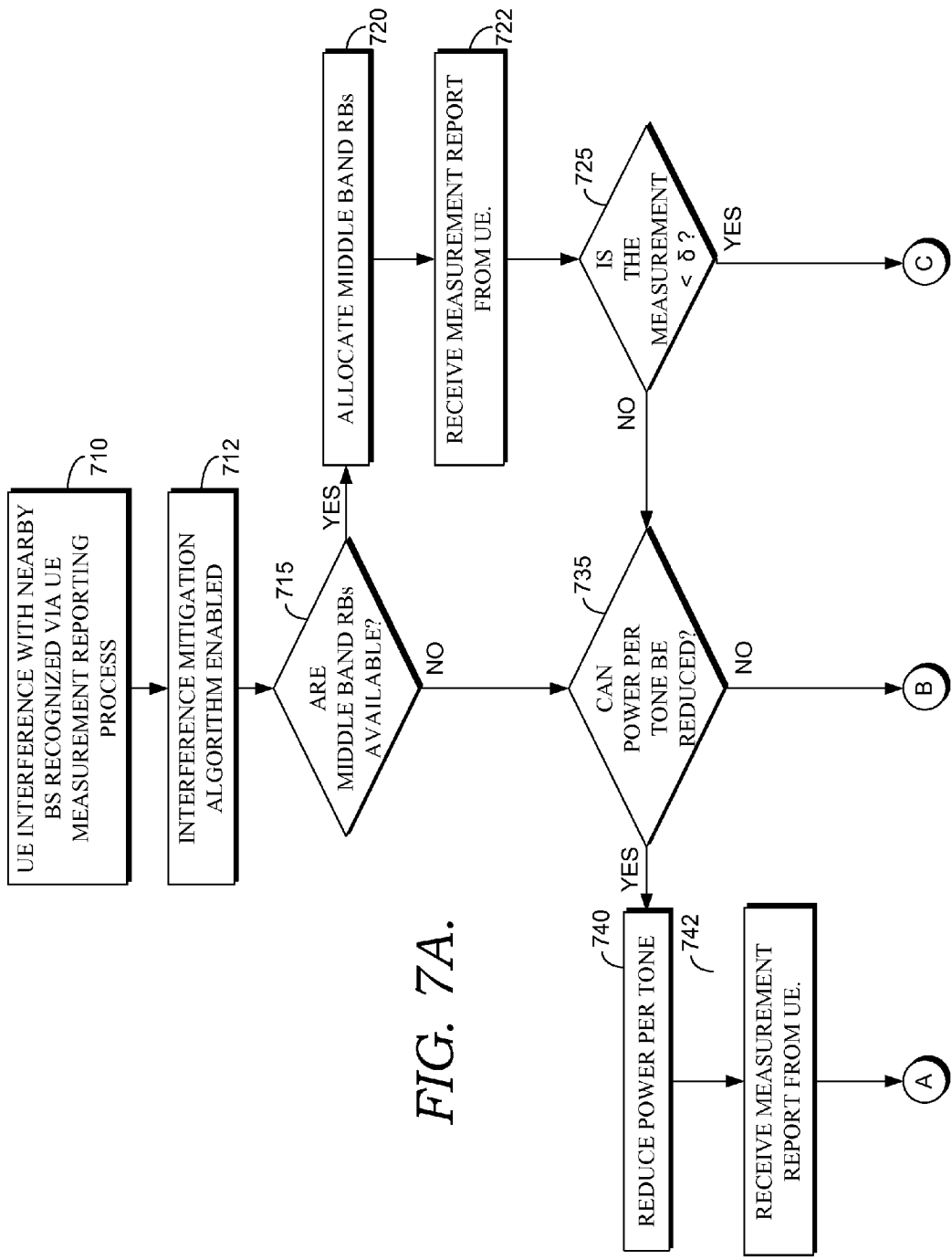
FIGS. 7A and 7B are flow diagrams which illustrates an exemplary process of mitigating interference according to embodiments of the invention.
Figure 7B:
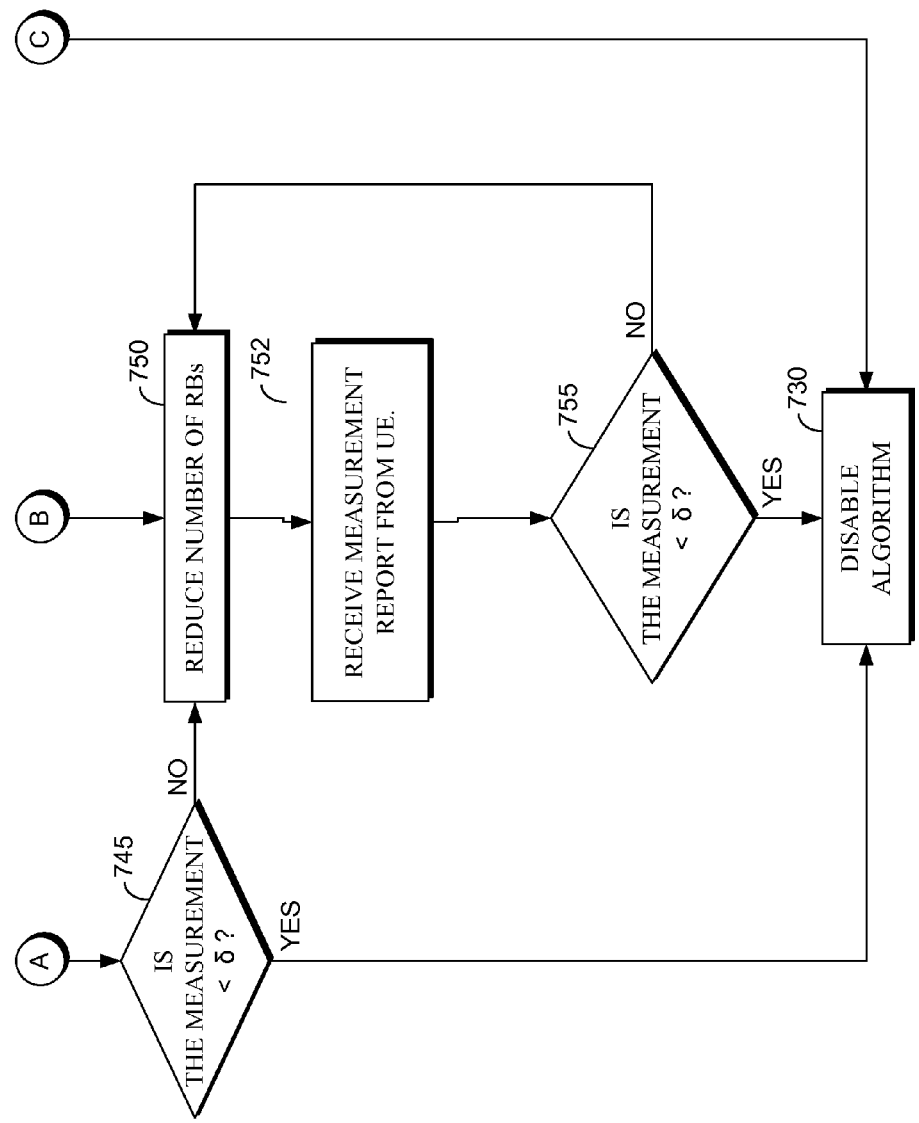

FIGS. 7A and 7B are flow diagrams, executed by a serving BS, illustrating a process of mitigating interference. In step 710, it is recognized that a UE, such as UE 320 is interfering with a nearby BS, such as adjacent BS 340. This recognition can be inferred by the serving BS, such as an eNodeB, from UE 320 log records of a DL reference signal, measured by UE 320. Since UE 320 is operating at a distant location from serving BS 310, i.e. near the edge of cell 330, then it will be operating at a high UL transmission level. Therefore, a low throughput modulation level would be assigned, such as QPSK, along with a low channel coding rate, such as level 6. An interference mitigation algorithm is enabled, via serving BS 310 in step 712.

In step 715, it is determined, via the interference mitigation algorithm enabled by serving BS 310, whether any middle band RBs from the UL subframe structure are available, such as from the UL subframe structure illustrated in FIG. 5. If middle band RBs are available, then the middle band RBs are allocated to UE 320 in step 720. Serving BS 310 requests a measurement report of the DL reference signal from UE 320 in step 722. UE 320 reports the DL reference signal measurement to serving BS 310. It is determined whether the measured DL reference signal is less than a certain threshold level, δ in step 725. If the measurement is less than δ, then the interference mitigation algorithm is disabled in step 730.

If there are no middle band RBs available in step 715, then it is determined whether the power per tone of the RBs can be reduced in step 735. The step 735 determination is also made if the threshold level in step 725 is not less than a certain threshold level, δ. If the power per tone of the RBs can be reduced in step 735, the power per sub-carrier is reduced for the respective RBs in step 740. Serving BS 310 requests a measurement report of the DL reference signal from UE 320 in step 742. UE 320 reports the measurement to serving BS 310. In step 745, it is determined whether the measured DL reference signal is less than a threshold level, δ. When the measured DL reference signal is not less than the threshold level, it can be inferred that the UE UL signal is above an acceptable level and is likely to be interfering with a nearby BS, such as adjacent BS 340. If the measurement is less than δ, then the algorithm is disabled in step 730.

If the power per tone cannot be reduced in step 735, then the number of RBs are reduced in step 750. The number of RBs is also reduced if the measured DL reference signal level is not less than δ in step 745. After the number of RBs has been reduced, serving BS 310 requests a measurement report of the DL reference signal from UE 320 in step 752. UE 320 reports the measurement to serving BS 310. In step 755, it is determined whether the measured DL reference signal is less than a threshold level, δ. When the measured DL reference signal is not less than the threshold level, it can be inferred that the UE UL signal is above an acceptable level and is likely to be interfering with a nearby BS, such as adjacent BS 340. If the measurement is not less than the threshold level, δ then the number of RBs is further reduced until the measurement is less than the threshold level, δ. If the measurement is less than δ, then the algorithm is disabled in step 730.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage media storing computer-readable instructions for an interference mitigation algorithm thereon that, when executed by a computing device, perform the following process steps:
   dividing a subframe frequency dimension into a plurality of resource block (RB) zones;
   allocating a middle band RB zone to a user equipment (UE) when the middle band RB zone is available;

reducing a power level of one or more sub-carriers of an edge band RB zone when there are no middle band RB zones available;

allocating the edge band RB zone with the reduced power level of one or more sub-carriers to the UE; and reducing a number of RBs to the UE when the power level of the one or more sub-carriers cannot be reduced.

2. The one or more computer-readable storage media of claim 1, wherein the middle band RB zone has a minimal level of radio frequency (rf) interference.

3. The one or more computer-readable storage media of claim 1, wherein the edge band RB zone has a higher level of rf interference.

4. The one or more computer-readable storage media of claim 1, wherein the interference mitigation algorithm is enabled when the UE is transmitting a maximum uplink signal.

5. The one or more computer-readable storage media of claim 1, wherein the interference mitigation algorithm is enabled when the UE is interfering with a nearby base station (BS).

6. The one or more computer-readable storage media of claim 1, wherein the interference mitigation algorithm is enabled by a BS serving the UE.

7. A computer-implemented method for interference mitigation, the method comprising:

dividing a subframe frequency dimension into a plurality of resource block (RB) zones;

allocating a middle band RB zone to a user equipment (UE) when the middle band RB zone is available;

reducing a power level of one or more sub-caiTiers of an edge band RB zone when there are no middle band RB zones available;

allocating the edge band RB zone with the reduced power level of one or more sub-carriers to the UE; and reducing a number of RBs to the UE when the power level of the one or more $ub-carriers cannot be reduced.

8. The method of claim 7, wherein the middle band RB zone has a minimal level of radio frequency (rf) interference.

9. The method of claim 7, wherein the edge band RB zone has a higher level of rf interference.

10. The method of claim 7, wherein interference mitigation is executed when the UE is transmitting a maximum uplink signal.

11. The method of claim 7, wherein interference mitigation is executed when the UE is interfering with a nearby base station (BS).

12. The method of claim 7, wherein interference mitigation is executed by a BS serving the UE.

13. A base station configured to provide interference mitigation, the base station comprising:

a controller that divides a subframe frequency dimension into a plurality of resource block (RB) zones and allocates a middle band RB zone to a user equipment (UE) when the middle band RB zone is available, but when there are no middle band RB zones available, the controller reduces a power level of one or more sub-carriers of an edge band RB zone and allocates the edge band RB zone with the reduced power level of one or more sub-carriers to the UE, or the controller reduces a number of RBs to the UE when the power level of the one or more sub-carriers cannot be reduced.

14. The base station of claim 13, wherein the middle band RB zone has a minimal level of radio frequency (rf) interference.

15. The base station of claim 13, wherein the edge band RB zone has a higher level of rf interference.

16. The base station of claim 13, wherein interference mitigation algorithm is executed when the UE is transmitting a maxi mum uplink signal.

17. The base station of claim 13, wherein interference mitigation algorithm is executed when the UE is interfering with a nearby base station (BS).

18. The base station of claim 13, wherein interference mitigation is executed by a BS serving the UE.

* * * * *

UNITED STATES PATENT AND TRADEMARK OFFICE
CERTIFICATE OF CORRECTION

PATENT NO.        : 9,553,680 B1
APPLICATION NO.   : 13/437383
DATED             : January 24, 2017
INVENTOR(S)       : Sungki Park et al.

It is certified that error appears in the above-identified patent and that said Letters Patent is hereby corrected as shown below:

In the Claims
Column 11, Line 31: "sub-caiTiers" should read --sub-carriers--.
Column 11, Line 37: "$ub-carriers" should read --sub-carriers--.
Column 12, Line 32: "maxi mum" should read --maximum--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*